United States Patent
Choi

(10) Patent No.: US 10,446,117 B2
(45) Date of Patent: Oct. 15, 2019

(54) MANUFACTURE AND OPTICAL CALIBRATION METHODS FOR DISPLAYS

(71) Applicant: Microsoft Technology Licensing, LLC, Redmond, WA (US)

(72) Inventor: Minhyuk Choi, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2 days.

(21) Appl. No.: 15/723,132

(22) Filed: Oct. 2, 2017

(65) Prior Publication Data

US 2019/0103073 A1 Apr. 4, 2019

(51) Int. Cl.
*G09G 5/14* (2006.01)
*G09G 5/02* (2006.01)
(Continued)

(52) U.S. Cl.
CPC .......... *G09G 5/14* (2013.01); *G09G 3/006* (2013.01); *G09G 5/022* (2013.01); *G09G 5/10* (2013.01); *G06F 3/04847* (2013.01); *G09G 2320/0276* (2013.01); *G09G 2320/0673* (2013.01); *G09G 2320/0686* (2013.01); *G09G 2320/0693* (2013.01); *G09G 2360/04* (2013.01); *G09G 2360/145* (2013.01)

(58) Field of Classification Search
CPC combination set(s) only.
See application file for complete search history.

(56) References Cited

U.S. PATENT DOCUMENTS 7,773,104 B2 * 8/2010 Chang ............... G09G 3/3696
345/690
9,305,492 B2 4/2016 Takahama et al.
(Continued)

FOREIGN PATENT DOCUMENTS

CN 105788514 A 7/2016

OTHER PUBLICATIONS

"International Search Report and Written Opinion Issued in PCT Application No. PCT/US2018/052767", dated Dec. 11, 2018, 11 Pages.

*Primary Examiner* — Wesner Sajous
(74) *Attorney, Agent, or Firm* — Alleman Hall Creasman & Tuttle LLP

(57) ABSTRACT

A method for optical calibration of a plurality of displays is provided. At a manufacturing stage, a plurality of one-time programmable (OTP) values for each display is created, each OTP value including a value of manufacture gamma voltage corresponding to a manufacture luminance and color value. The OTP values are stored in non-volatile memory of the respective display. At an assembly stage, each display is connected to a respective power management integrated circuit (PMIC); assembly test voltages are applied corresponding to the manufacture gamma voltage of each stored OTP value. Differences between assembly luminance and color values of each display and an expected value as a result of applying each assembly test voltage are measured. For each display, one value of manufacture gamma voltage of a respective OTP value is selected that corresponds to a minimal difference between the assembly luminance and color values and the expected value.

20 Claims, 9 Drawing Sheets

(51) Int. Cl.
*G09G 5/10* (2006.01)
*G09G 3/00* (2006.01)
*G06F 3/048* (2013.01)
*G06F 3/0484* (2013.01)

(56) References Cited

U.S. PATENT DOCUMENTS

| | | |
|---|---|---|
| 9,589,510 B2 | 3/2017 | Lee et al. |
| 9,633,601 B2 | 4/2017 | Cheon et al. |
| 2005/0206641 A1* | 9/2005 | Morita ................ G09G 3/3696 345/211 |
| 2006/0284898 A1* | 12/2006 | Shen ................... G09G 3/006 345/690 |
| 2008/0151135 A1* | 6/2008 | Yang ................... G09G 3/3655 349/33 |
| 2009/0040163 A1 | 2/2009 | Sun |
| 2011/0234644 A1 | 9/2011 | Park et al. |
| 2011/0298695 A1* | 12/2011 | Hajjar ................ G02B 26/101 345/84 |
| 2012/0001929 A1* | 1/2012 | Chang .................. G09G 3/006 345/545 |
| 2012/0050505 A1* | 3/2012 | Yabui ................ G02B 27/2235 348/54 |
| 2012/0062609 A1 | 3/2012 | Jeon |
| 2014/0139132 A1 | 5/2014 | Kwak |
| 2015/0279301 A1* | 10/2015 | Li ....................... G09G 3/3688 345/89 |
| 2015/0371579 A1 | 12/2015 | Yu et al. |
| 2016/0140891 A1* | 5/2016 | Lim .................... G09G 3/2007 345/690 |
| 2016/0189676 A1 | 6/2016 | Pyo |
| 2017/0103707 A1 | 4/2017 | Park et al. |

\* cited by examiner

MANUFACTURE AND OPTICAL CALIBRATION METHODS FOR DISPLAYS

BACKGROUND

Display devices with multiple screens are advantageous over single-screen devices for certain applications. Dual-screen devices, for example, may be useful for e-readers, communication devices, and in medical settings, as some limited examples. Optical calibration methods currently exist to optimize emitted light characteristics from single electronic displays; however, optical calibration methods for dual-screen devices have yet to be developed. Using single-screen calibration methods on each of the displays in a dual screen device can result in fully calibrated displays that nonetheless are not matched to each other. This can cause visual discomfort for the user.

SUMMARY

A method for optical calibration of a plurality of displays is provided. The method may include, at a manufacturing stage, creating a plurality of one-time programmable (OTP) values for each display. Each OTP value may include a value of manufacture gamma voltage corresponding to a manufacture luminance and color value for a respective display. The method may include storing the plurality of OTP values in a corresponding non-volatile memory of each respective display.

The method may further include, at an assembly stage, connecting each display to a respective power management integrated circuit (PMIC). The method may include applying a plurality of assembly test voltages to each display corresponding to the value of manufacture gamma voltage of each stored OTP value, and may include measuring differences between a plurality of assembly luminance and color values for each display and an expected luminance and color value as a result of applying each assembly test voltage corresponding to each stored OTP value. The method may further include, for each display, selecting one value of manufacture gamma voltage of a respective OTP value for the respective display corresponding to a minimal difference between the plurality of assembly luminance and color values and the expected luminance and color value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
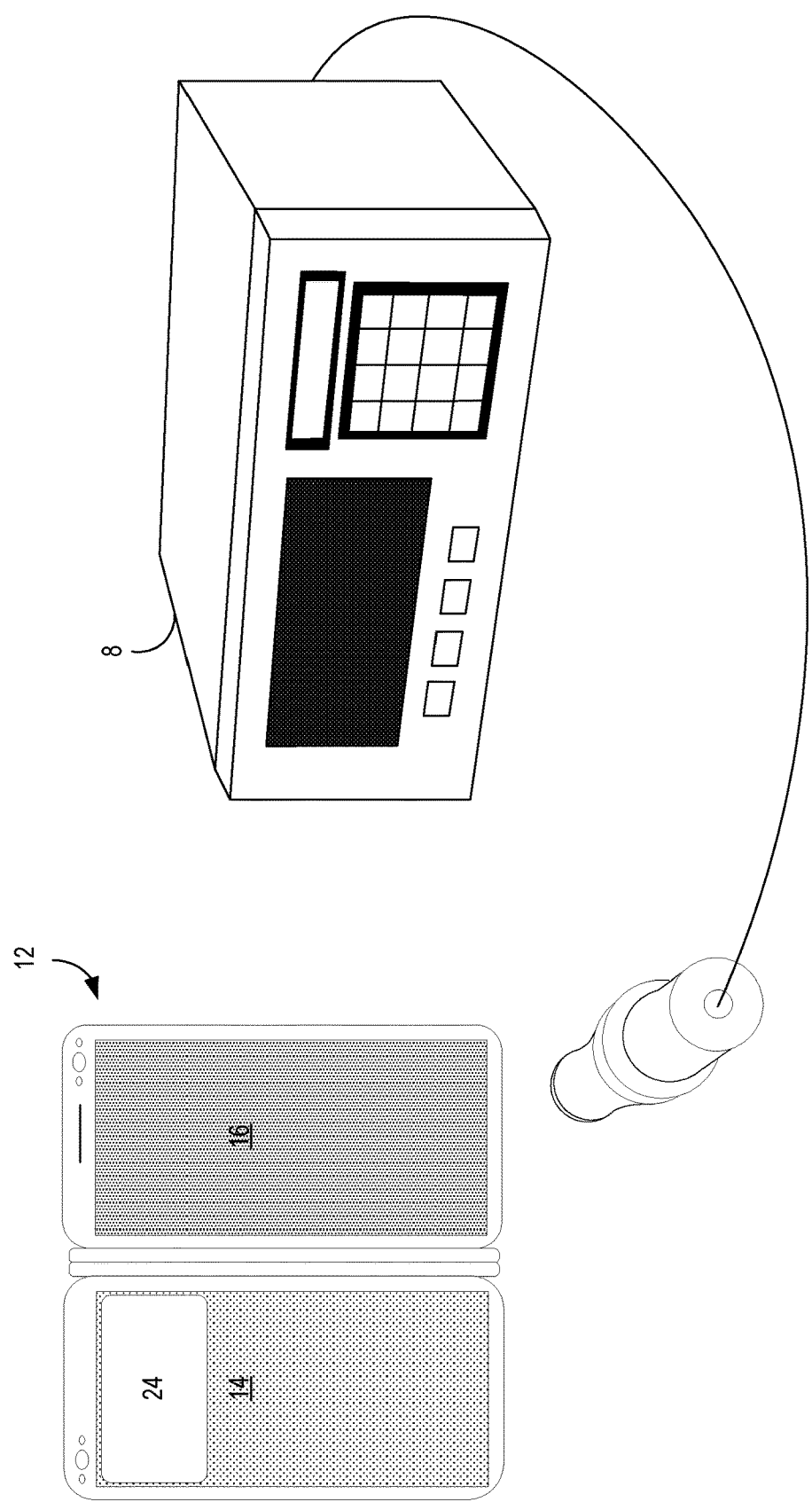
FIG. 1 illustrates two displays in a two-panel device, luminance and color of the displays measured by a color analyzer.

With the advent of dual-display devices, conventional display calibration methods have offered little for ensuring optical equivalence between displays in a single device. Display devices that undergo optical calibration at manufacture may include a single stored one-time programmable value for gamma correction. At assembly, the luminance and color of the display may not be precise to the one-time programmable value due to tolerance ranges. Although not troublesome for a single display device, this can be problematic for dual-display devices where luminance and color variation between two display panels may be noticeable and distracting to a user. The single one-time programmable value for gamma correction is set at manufacture and not given to alteration. While some software calibration is possible at the assembly stage, significant optical adjustments are not generally feasible past the point of manufacture.

In response to these challenges recognized by the inventors and discussed above, a display device 12 including at least two displays 14, 16 is provided. The displays may be any type of display including OLED, AMOLED, PMOLED, CCFL, CRT, VF, DLP, ELD, FED, FPD, LCD, LED, or similar technology. The display device 12 includes a non-volatile memory 18, 20 for each display 14, 16; each memory 18, 20 includes a plurality of stored values of manufacture gamma voltage corresponding to manufacture luminance and color values. The non-volatile memory may include, for example, a display driver integrated circuit (DDIC). Each stored manufacture gamma voltage value is stored in the respective memory 18, 20 as a one-time programmable (OTP) value 22. Also on the display device 12 a user interface 24 may be included, the user interface 24 configured to receive a selection of gamma voltage from the OTP values 22 of each display 14, 16.

FIG. 1 depicts an optical calibration device in the form of a color analyzer 8, which may be used to measure the luminance and color values of display device 12. As shown in FIG. 1, each display 14, 16 may have slightly different luminance and color values despite being similarly calibrated at a manufacturing stage 26 because of tolerance ranges for each display 14, 16. User interface 24 may receive selections for one of the plurality of OTP values 22 that each correspond to one setting for manufacture luminance and color values.

Figure 2:
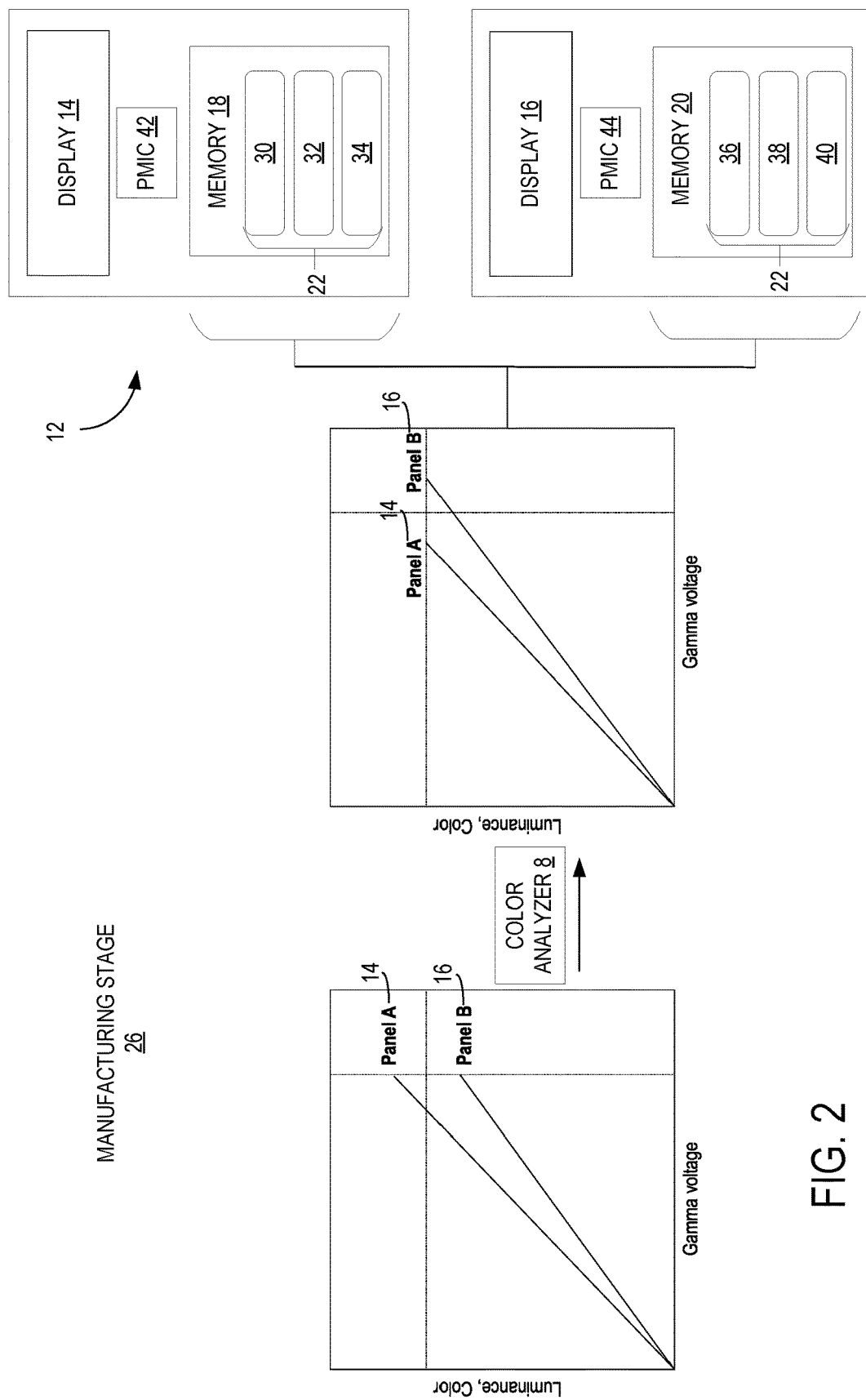
FIG. 2 is a schematic of gamma voltage measurement and one-time programmable (OTP) value storage for displays at a manufacturing stage.

FIG. 2 illustrates optical calibration at the manufacturing stage 26, in one implementation. Gamma correction may be performed on each display 14, 16 by using color analyzer 8, as is depicted graphically in FIG. 2. As a result of optical calibration, a plurality of settings for gamma voltage corresponding to luminance and color values may be available. In the depicted embodiment, a plurality of gamma voltage values are stored in the non-volatile memory 18, 20 in the form of a plurality of OTP values 22. For example, the display 14 in FIG. 2 has first display OTP values 30, 32, 34, which are different from each other, and display 16 in FIG. 2 has second display OTP values 36, 38, 40, which are also different from each other. It will be appreciated that the number of OTP values 22 for any display may include any number of storable values.

Figure 3:
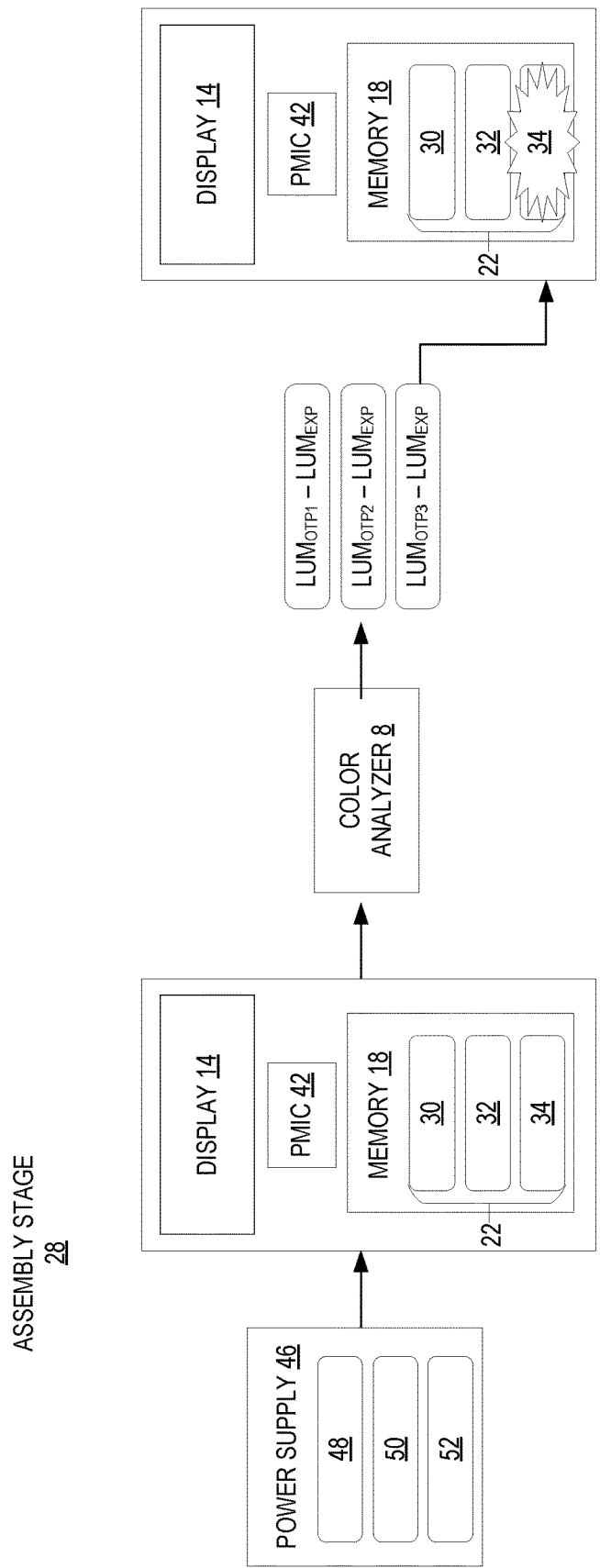
FIG. 3 is a schematic showing application of test voltages to a display and measurement of differences between luminance and color values at an assembly stage.

The user interface 24 may be additionally configured to, for each display 14, 16, measure a difference between current luminance and color values and an expected luminance and color value. The expected luminance and color value may be the luminance and color value expected at manufacture. The current luminance and color values may result from applying first test voltages 48, 50, 52 via power supply 46 corresponding to each stored OTP value 22; this application of first test voltages 48, 50, 52 may be performed at an assembly stage 28 as shown in FIG. 3 such that the first test voltages 48, 50, 52 are assembly test voltages. At assembly stage 28, each display 14, 16 may be connected to a respective power management integrated circuit (PMIC) 42, 44. As depicted schematically in FIG. 3, a user may find that a minimal difference exists between one of the current luminance and color values $LUM_{OTP1}$, $LUM_{OTP2}$, and $LUM_{OTP3}$ resulting from applying the first test voltages 48, 50, 52 and the expected luminance and color value $LUM_{EXP}$. A subsequent selection of gamma voltage by the user, which corresponds to the selection of one of the stored OTP values 22, may be based on the minimal difference measured. In FIG. 3, the OTP value 22 best matching the luminance and color values desired by the user is first display OTP value 34, and thus this OTP value 22 is selected. It will be appreciated that the user has the option to select an OTP value 22 that does not necessarily match the manufacturer's specifications, or expected value.

Figure 4:
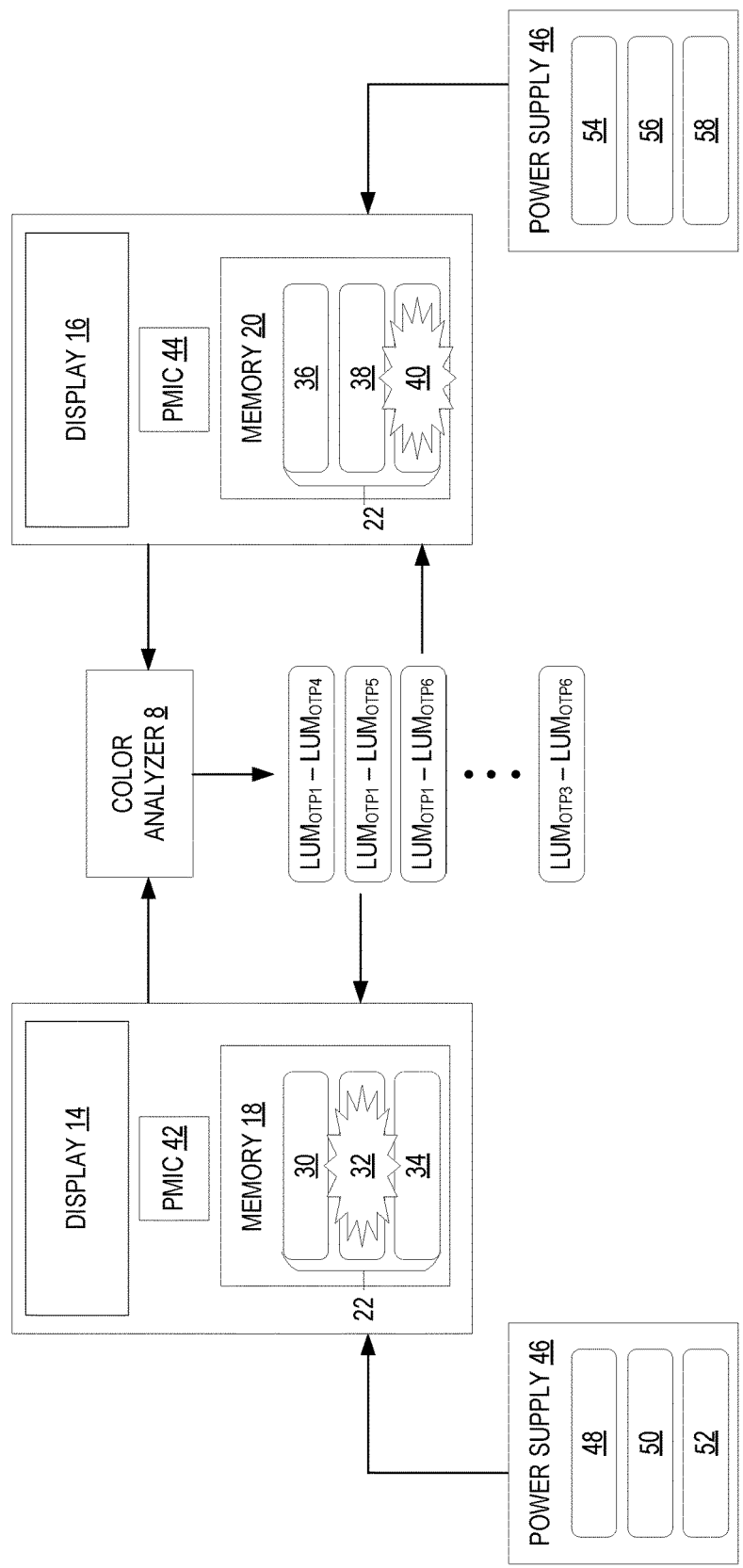
FIG. 4 is a schematic of finding an error between luminance and color values for a first and second display, manufacture gamma voltage being reselected separately for each display as determined by the error.

Storing a plurality of OTP values 22 for each display 14, 16 has one potential advantage that each display 14, 16 may be re-calibrated after the manufacturing stage 26; this is particularly important for several reasons. Given that displays 14, 16 may each have specific tolerance ranges within which they may vary, the displays themselves may not always show the exact expected luminance and color values. At assembly, the connection of a new PMIC may cause a display to vary within its tolerance range. Furthermore, the displays may not be set at manufacture to match each other in terms of luminance and color values. After manufacturing stage 26, a particular display with associated OTP values 22 may be checked against its own OTP values 22 to determine whether the OTP value 22 chosen at manufacture remains the optimal choice for the particular display, as shown in FIG. 3 and described above. However, the displays 14, 16 may also be compared to each other after manufacturing stage 26 as well. One implementation of this configuration is shown in FIG. 4. The user interface 24 may be configured to find an error between luminance and color values of a first one and a second one of the displays 14, 16. The selection of gamma voltage may be determined from a minimization of the error found between the luminance and color values of a first one and a second one of the displays 14, 16.

As shown in FIG. 4, power supply 46 may be connected to the displays 14, 16; first test voltages 48, 50, and 52 corresponding to each first display OTP values 30, 32, 34 may be applied to display 14 while second test voltages 54, 56, 58 corresponding to each second display OTP values 36, 38, 40 may be applied to display 16. It will be appreciated that the stored OTP values 22 for each display 14, 16, may not be the same. Color analyzer 8 may be used to measure current luminance and color values of displays 14, 16 as a result of applying the test voltages. Differences may be found between each luminance and color values measurement for each display 14, 16; for example, $LUM_{OTP4}$ $LUM_{OTP5}$, and $LUM_{OTP6}$ may each be subtracted from $LUM_{OTP1}$, $LUM_{OTP2}$, and $LUM_{OTP3}$ as shown in FIG. 4. The smallest difference between luminance and color values of displays 14, 16 may be used to determine the selected OTP value 22 for each display 14, 16. As shown in FIG. 4, the first display OTP value 32 is selected for display 14 and the second display OTP value 40 is selected for display 16. It will be appreciated that other formulaic, algorithmic, or statistical methods may be employed in determining the optimal selection of OTP values 22 for each display 14, 16. As noted above, the user may select an OTP value 22 that does not necessarily match the manufacturer's specification. This is particularly important where matching two or more displays to each other may require selecting an OTP value 22 other than the manufacturer's specification for one or more of the displays.

The at least two displays 14, 16 may be incorporated into a unitary two-panel device as shown in FIG. 1 for display device 12. The two-panel device may include a housing unit for each display, each housing unit connected by a hinge. In other implementations, the displays may be connected by other mechanical means, separately framed, or manufactured in separate housings, although other configurations are possible. It will be appreciated that the stored values of manufacture gamma voltage corresponding to manufacture luminance and color values may include a manufacture gamma correction at manufacturing stage 26, although full correction at that time is not necessary for the storage of a plurality of OTP values 22 for each display 14, 16 that correspond to manufacture luminance and color values.

Figure 5:
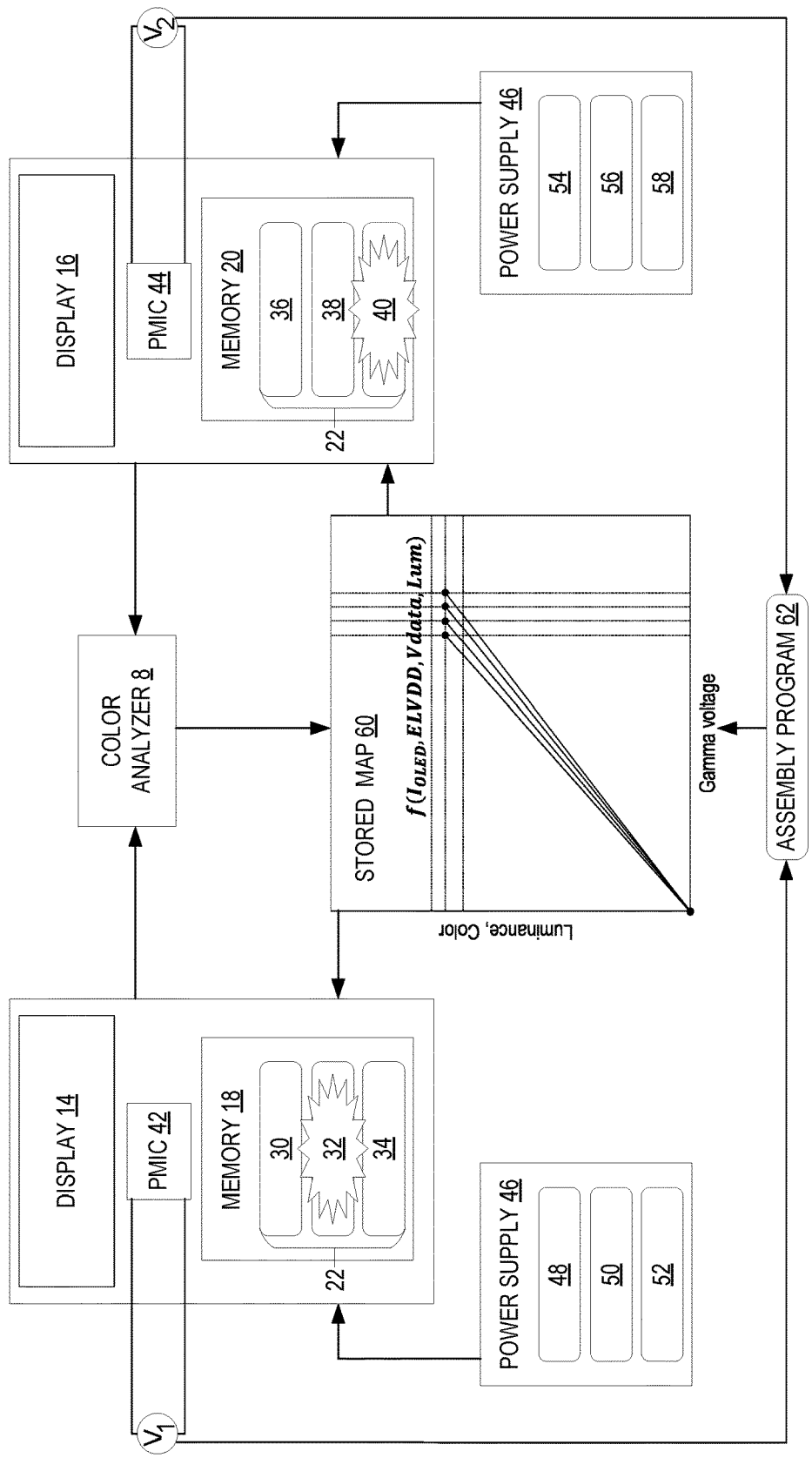
FIG. 5 is a schematic for measuring voltage output of a power management integrated circuit (PMIC) of each display and determining voltage output corresponding to minimized error of luminance and color values, including a plot of the values versus gamma voltage.

FIG. 5 shows an additional implementation of the claimed configuration. Voltage output of each PMIC 42, 44 that powers a respective display 14, 16 may be measured and the color analyzer 8 may be used to measure the luminance and color values of each display 14, 16. The voltage output and luminance and color values may be saved in stored maps 60 stored in the non-volatile memory 18, 20 for the respective displays 14, 16. The stored maps 60 may be generated by an assembly program 62 that takes measured voltage output of each PMIC 42, 44 and plots luminance and color values against first test voltages 48, 50, 52 and second test voltages 54, 56, 58 for each value of measured voltage output of each PMIC 42, 44. This is shown graphically in FIG. 5. It will be appreciated that, in this configuration, the graphical plots consist essentially of point measurements of luminance and color values of each display 14, 16 and first test voltages 48, 50, 52 and second test voltages 54, 56, 58. Optical calibration may be performed using a function of parameters such as current to the display device and PMIC voltage output as well as applied test voltage and luminance. For example, FIG. 5 displays a plot of luminance and color versus gamma voltage, and optical correction is a function represented by $f(I_{OLED}, ELVDD, V_{data}, Lum)$. Here, the parameter $I_{OLED}$ is the display current where the display is an OLED device and the current I of the OLED device is measured. The PMIC voltage may be measured as an ELVDD value, which is PMIC output voltage from a PMIC pin. $V_{data}$ is applied test voltage and Lum is luminance. Using the generated plots of stored maps 60 and an optical calibration function, it may be determined how to change a voltage applied to the PMICs 42, 44 to produce luminance and color values of displays 14, 16 such that the appearances of the displays match as closely as possible.

Figure 6A:
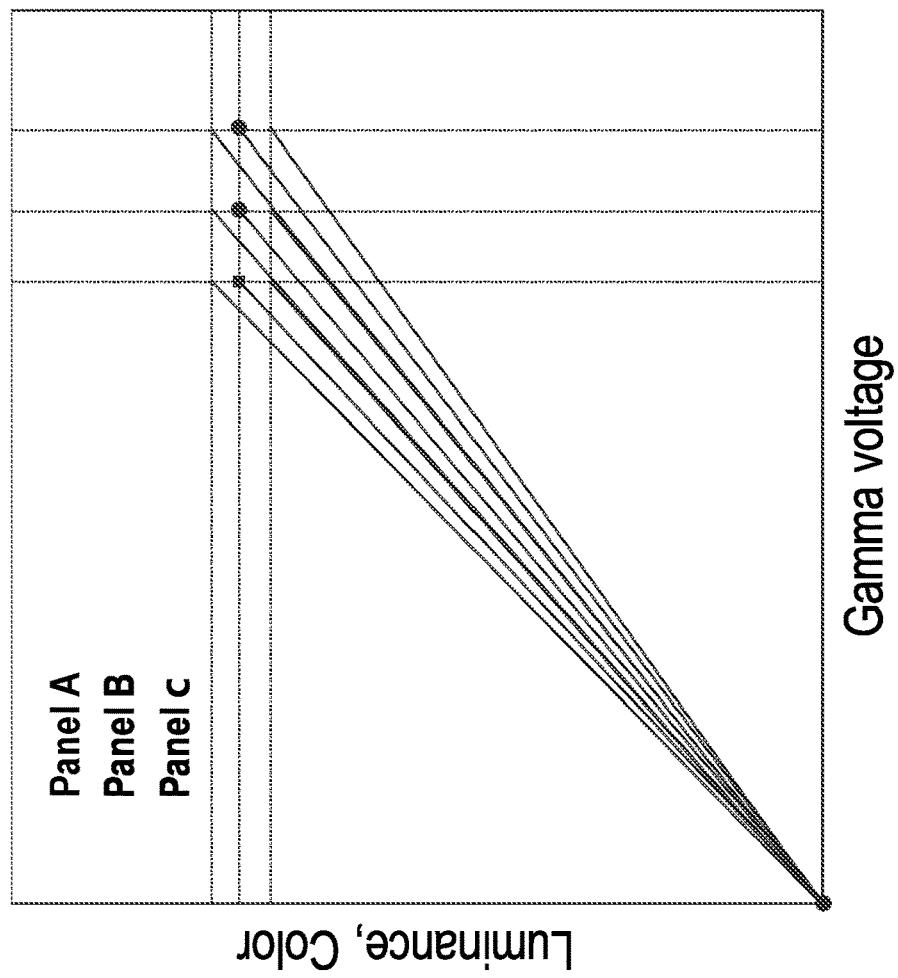
FIGS. 6A and 6B graphically illustrate ideal calibration of PMIC output voltage ELVDD.
Figure 6B:
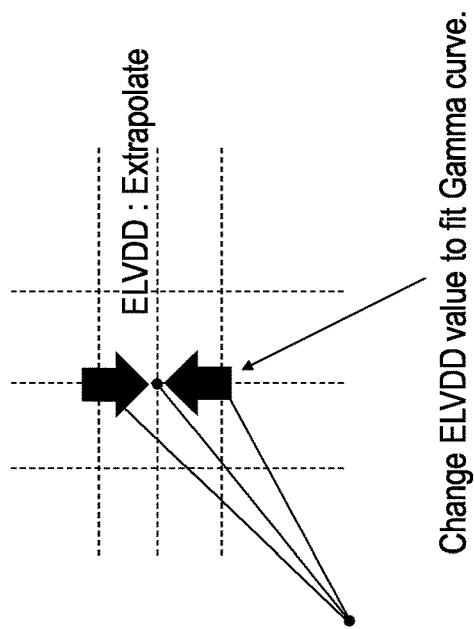

Ideally, in order to execute very precise changes in optical calibration, output voltage of the PMIC, or ELVDD, would be controlled and adjusted by small amounts through an applied voltage. However, currently the inventors are not aware of an existing method for such precise control. While ELVDD may be adjusted, the voltage applied to the PMIC is generally at best on the order of volts; ELVDD, however, is output in a millivolt range. Therefore, when applying a test voltage, it is not currently known to the inventors how to test within the millivolt range of ELVDD. This problem is shown graphically in FIGS. 6A, 6B. Three panels A, B, C, each corresponding to a separate display, are to be optically calibrated. A different gamma voltage may be chosen for each panel such that the luminance and color values match between each separate display, as shown in FIG. 6A. However, it may be optimal for ELVDD of the PMIC corresponding to each separate display to be adjusted in order to optimize the luminance and color values for a particular display. The ideal extrapolation is shown in FIG. 6B. However, due to the physical constraints discussed above a method for obtaining this precision with commercially available componentry is not known.

Figure 7:
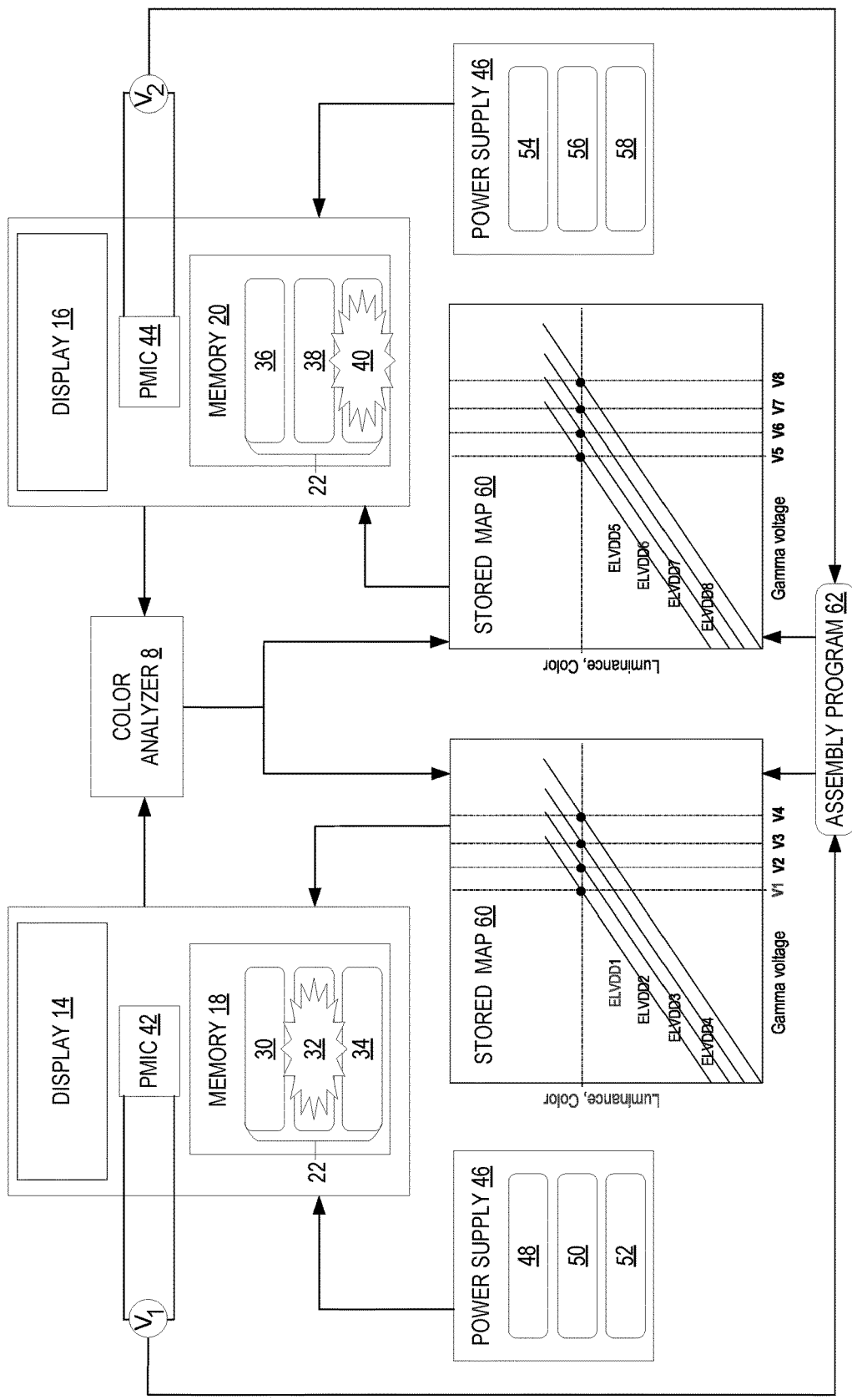
FIG. 7 is a schematic for extrapolating values of PMIC voltage output and determining a corrected value of PMIC voltage output from the extrapolated values that minimizes error between luminance and color values of the displays.

FIG. 7 is a schematic showing how precise adjustment of ELVDD may be possible in the claimed configuration. Similarly to FIG. 5, luminance and color values may be measured by a color analyzer 8. A power supply 46 provides first test voltages 48, 50, 52 and second test voltages 54, 56, 58. Voltage output of each PMIC 42, 44 that powers a respective display 14, 16 may be measured. The voltage output and luminance and color values may be saved in stored maps 60 in the non-volatile memory 18, 20 for the respective displays 14, 16. The stored maps may be generated by an assembly program 62 that plots luminance and color values against first test voltages 48, 50, 52 and second test voltages 54, 56, 58 for each value of measured voltage output of each PMIC 42, 44. It will be appreciated that any number of test voltages may be used. Stored maps 60 are shown graphically as plots in FIG. 7. In each plot, PMIC output voltage is shown as ELVDD. Multiple curves are generated for ELVDD values. A desired value for ELVDD may be extrapolated from the plots; in this case, the desired ELVDD value may be extracted from between the empirically generated curves. Consequently, an extrapolated voltage output of each PMIC 42, 44 is extrapolated from the stored maps 60. One potential advantage of this configuration is that the extrapolation may be within tolerances of the measured voltage output of each PMIC 42, 44. To complete optical calibration, the selection of gamma voltage may correspond to the extrapolated voltage output of each PMIC 42, 44. As shown in FIG. 7, the selected gamma voltage for display 14 corresponds to first display OTP value 32, and the selected gamma voltage for display 16 corresponds to second display OTP value 40.

In one example of the above configuration, $V_{data}$ is applied corresponding to OTP values 22 of gamma voltage. $V_{data}$ ranges, in this example, from 3 V to 6 V based on given set of OTP values 22 for one display 14. Each $V_{data}$ generates an ELVDD value from the PMIC 42 and a resulting $I_{OLED}$ of the display 42 produces a particular luminance and color value. However, at the assembly stage 28, a wider range of $V_{data}$ may be applied, a different range of $V_{data}$ may be applied, or $V_{data}$ values in smaller increments may be applied. For example, $V_{data}$ may be chosen to range from 2.9 V to 5.9 V with values between those designated by the OTP values 22. As shown in FIG. 7, curves for different ELVDD values may be generated with such an approach. A potential advantage of this configuration is that a greater amount of detail is available to enable extrapolation of a desired ELVDD value. Should the ELVDD value that corrects the luminance and color value of one display 14 to more closely match a second display 16 fall within the tolerance range of the display 14, this method may be applied to find the desired ELVDD value. The desired ELVDD value may be implemented through the application of a $V_{data}$ value to the PMIC corresponding to the desired ELVDD value, completing the optical calibration of the displays 14, 16.

Figure 8:
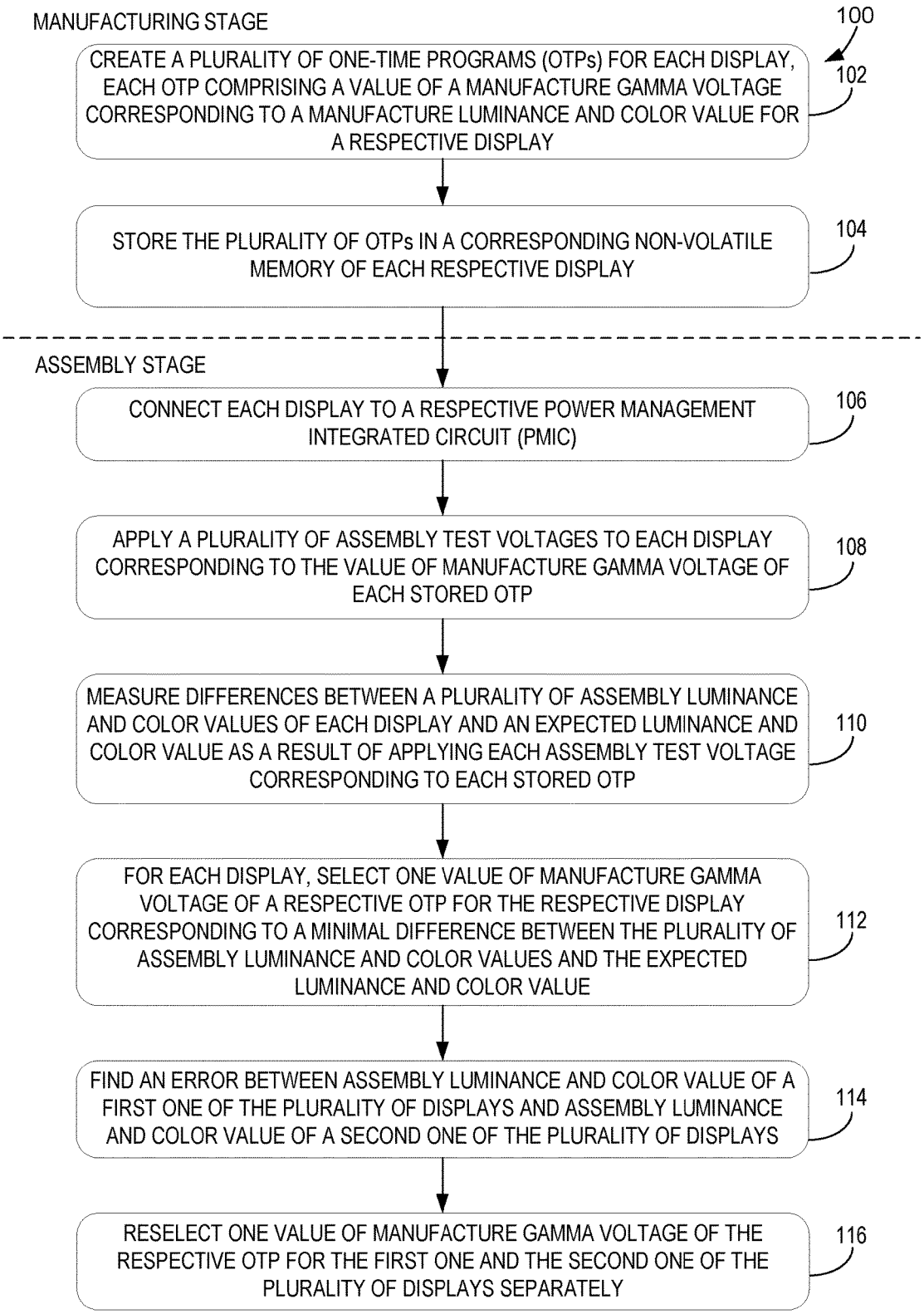
FIG. 8 is a flowchart of a method for optical calibration of a plurality of displays according to one implementation of the present disclosure.

FIG. 8 illustrates a method 100 for optical calibration of a plurality of displays 14, 16. The displays 14, 16 may be incorporated into display device 12. The display device 12 may include a user interface 24 configured to receive a selection of gamma voltage from a user, the gamma voltage selected from the OTP values 22 of each display 14, 16. At a manufacturing stage 26, the method at 102 includes creating a plurality of OTP values 22 for each display 14, 16, each OTP value 22 comprising a value of a manufacture gamma voltage corresponding to a manufacture luminance and color value for a respective display 14, 16. The OTP values 22 may include first display OTP values 30, 32, 34 and second display OTP values 36, 38, 40. The method at 104 includes storing the plurality of OTP values 22 in a corresponding non-volatile memory 18, 20 of each respective display 14, 16.

At an assembly stage 28, the method at 106 includes connecting each display 14, 16 to a respective power management integrated circuit (PMIC) 42, 44. At 108, the method includes applying a plurality of assembly test voltages to each display 14, 16 corresponding to the value of manufacture gamma voltage of each stored OTP value 22. These may include first test voltages 48, 50, 52 and second test voltages 54, 56, 58. The test voltages may be applied via power supply 46. At 110 the method further includes measuring differences between a plurality of assembly luminance and color values of each display 14, 16 and an expected luminance and color value as a result of applying each assembly test voltage corresponding to each stored OTP value 22. Luminance and color values may be measured via the color analyzer 8. The method at 112 includes, for each display 14, 16, selecting one value of manufacture gamma voltage of a respective OTP value 22 for the respective display 14, 16 corresponding to a minimal difference between the plurality of assembly luminance and color values and the expected luminance and color value. Example equations for these differences are given above.

At 114, the method further includes finding an error between assembly luminance and color value of a first one of the plurality of displays 14 and assembly luminance and color value of a second one of the plurality of displays 16. The method at 116 includes reselecting one value of manufacture gamma voltage of the respective OTP value 22 for the first one and the second one of the plurality of displays 14, 16 separately.

As described above, the reselected value may be determined from a minimization of the error found between the assembly luminance and color value of the first one and the assembly luminance and color value of a second one of the plurality of displays 14, 16. Also, the method may include assembling the first one and the second one of the plurality of displays 14, 16 into a unitary two-panel device as shown in FIG. 1. The two-panel device may include a housing for each display, each housing connected at a hinge such that the display device 12 is a hinged device.

The method may also include, when creating the plurality of OTP values 22, performing gamma correction for the manufacture luminance and color value at a plurality of manufacture gamma voltages for each of the plurality of displays 14, 16. It will be appreciated that gamma correction may not be required at manufacture; a plurality of OTP values 22 may be generated without selecting a gamma correction for the respective displays 14, 16.

The method may also include measuring voltage output of a power management integrated circuit (PMIC) 42, 44 that powers each display 14, 16, the voltage output corresponding to the assembly test voltage. As discussed above, this may be followed by determining a value of voltage output of the PMIC 42, 44 corresponding to minimized error of assembly luminance and color values. Selecting a value of manufacture gamma voltage from a respective OTP value 22 for the first one and the second one of the plurality of displays 14, 16 may include determination of a value of an assembly test voltage corresponding to the determined value of voltage output of the PMIC 42, 44. The selected value of manufacture gamma voltage from a respective OTP value may correspond to the determined value of assembly test voltage.

The determined value of assembly test voltage may correspond to a value on a curve of the assembly luminance and color values plotted against gamma voltage, as shown in FIG. 5, the assembly luminance and color values being a function of voltage output of the PMIC 42, 44 and assembly test voltages.

For each value of a plurality of voltage output values of the PMIC 42, 44, the plurality of assembly luminance and color values may be plotted against the plurality of assembly test voltages as shown in FIG. 7. Values of voltage output of the PMIC 42, 44 may be extrapolated within the plotted values and assembly test voltages as discussed above. A corrected value of voltage output of the PMIC 42, 44 may be determined from the extrapolated values that minimizes the error found between the plurality of assembly luminance and color values. A corresponding value of assembly test voltage for the corrected value of voltage output of the PMIC 42, 44 may be determined.

As discussed above, the extrapolated values of voltage output of the PMIC 42, 44 may correspond to differences on the order of several millivolts of voltage output of the PMIC 42, 44, given as ELVDD. The extrapolated values of voltage output of the PMIC 42, 44 may be within tolerances of PMIC voltage output. It will be appreciated that, given the method of extrapolation described above, assembly test voltages may be applied to the PMIC 42, 44 outside of a range of manufacture gamma voltages. This is one potential advantage of the claimed configuration, as resulting assembly luminance and color values may be measured and included in plotting the plurality of assembly luminance and color values. Consequently, a desired value for PMIC output voltage, or ELVDD, may be chosen within a range outside that applied in the manufacturing stage 26.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
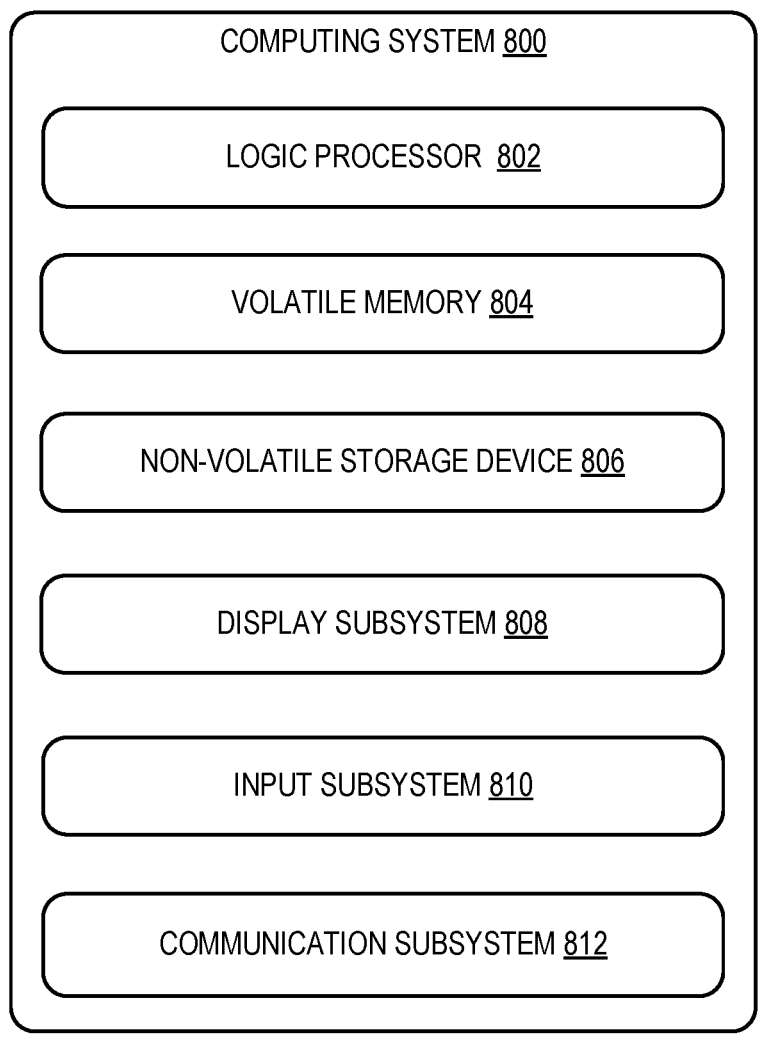
FIG. 9 is an example computing system according to an implementation of the present disclosure.

FIG. 9 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 9.

Logic processor 802 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. Additionally or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 800 typically implemented in software by a processor to perform a particular function using portions of volatile memory, which function involves transformative processing that specially configures the processor to perform the function. Thus, a program may be instantiated via logic processor 802 executing instructions held by non-volatile storage device 806, using portions of volatile memory 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 808 may be used to present a visual representation of data held by non-volatile storage device 806. This visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The following paragraphs provide additional support for the claims of the subject application. One aspect provides a method for optical calibration of a plurality of displays. The method comprises, at a manufacturing stage, creating a plurality of one-time programmable (OTP) values for each display, each OTP value comprising a value of a manufacture gamma voltage corresponding to a manufacture luminance and color value for a respective display. The plurality of OTP values is stored in a corresponding non-volatile memory of each respective display.

In this aspect, additionally or alternatively, at an assembly stage, each display may be connected to a respective power management integrated circuit (PMIC). A plurality of assembly test voltages may be applied to each display corresponding to the value of manufacture gamma voltage of each stored OTP value. Differences may be measured between a plurality of assembly luminance and color values of each display and an expected luminance and color value as a result of applying each assembly test voltage corresponding to each stored OTP value. For each display, one value of manufacture gamma voltage of a respective OTP value may be selected for the respective display corresponding to a minimal difference between the plurality of assembly luminance and color values and the expected luminance and color value.

In this aspect, additionally or alternatively, an error may be found between assembly luminance and color value of a first one of the plurality of displays and assembly luminance and color value of a second one of the plurality of displays. One value of manufacture gamma voltage of the respective OTP value may be reselected for the first one and the second one of the plurality of displays separately.

In this aspect, additionally or alternatively, the reselected value may be determined from a minimization of the error found between the assembly luminance and color value of the first one and the assembly luminance and color value of a second one of the plurality of displays. In this aspect, additionally or alternatively, the first one and the second one of the plurality of displays may be assembled into a unitary two-panel device. In this aspect, additionally or alternatively, creating the plurality of OTP values may include gamma correction for the manufacture luminance and color value at a plurality of manufacture gamma voltages for each of the plurality of displays.

In this aspect, additionally or alternatively, voltage output of a power management integrated circuit (PMIC) that powers each display may be measured, the voltage output corresponding to the assembly test voltage. A value of voltage output of the PMIC corresponding to minimized error of assembly luminance and color values may be determined. Selecting a value of manufacture gamma voltage of a respective OTP value for the first one and the second one the plurality of displays may include determination of a value of an assembly test voltage corresponding to the determined value of voltage output of the PMIC, the selected value of manufacture gamma voltage of a respective OTP value corresponding to the determined value of assembly test voltage.

In this aspect, additionally or alternatively, the determined value of assembly test voltage may correspond to a value on a curve of the assembly luminance and color values plotted against gamma voltage, the assembly luminance and color values being a function of voltage output of the PMIC and assembly test voltages.

In this aspect, additionally or alternatively, for each value of a plurality of voltage output values of the PMIC, the plurality of assembly luminance and color values may be plotted against the plurality of assembly test voltages. Values of voltage output of the PMIC within the plotted values and assembly test voltages may be extrapolated. A corrected value of voltage output of the PMIC from the extrapolated values that minimizes the error found between the plurality of assembly luminance and color values may be determined. A corresponding value of assembly test voltage for the corrected value of voltage output of the PMIC may be determined.

In this aspect, additionally or alternatively, the extrapolated values of voltage output of the PMIC may correspond to differences on the order of several millivolts of voltage output of the PMIC. In this aspect, additionally or alternatively, the extrapolated values of voltage output of the PMIC may be within tolerances of PMIC voltage output. In this aspect, additionally or alternatively, assembly test voltages outside of a range of manufacture gamma voltages may be applied to the PMIC and resulting assembly luminance and color values may be measured. The resulting assembly luminance and color values may be included in plotting the plurality of assembly luminance and color values.

Another aspect provides a display device, comprising at least two displays and a non-volatile memory for each display, each memory including a plurality of stored values of manufacture gamma voltage corresponding to manufacture luminance and color values, each stored manufacture gamma voltage corresponding to a one-time programmable (OTP) value. The display device further comprises a user interface configured to receive a selection of gamma voltage from the OTP values of each display.

In this aspect, additionally or alternatively, the user interface may be further configured to, for each display, measure a difference between current luminance and color values and an expected luminance and color value as a result of applying a test voltage corresponding to each stored OTP value. The selection of gamma voltage may correspond to a minimal difference between the current luminance and color values and the expected luminance and color value.

In this aspect, additionally or alternatively, the user interface may be further configured to find an error between luminance and color values of a first one and a second one of the displays. The selection of gamma voltage may be determined from a minimization of the error found between the luminance and color values of a first one and a second one of the displays. In this aspect, additionally or alternatively, the device may further comprise a unitary two-panel device into which the at least two displays may be incorporated. In this aspect, additionally or alternatively, the stored values of manufacture gamma voltage corresponding to manufacture luminance and color values may include a manufacture gamma correction.

In this aspect, additionally or alternatively, a plurality of power management integrated circuits (PMICs) may each power a respective display. Stored maps may be stored in the non-volatile memory. The stored maps may be generated by an assembly program that measures a voltage output of each PMIC and plots luminance and color values against assembly test voltages for each value of measured voltage output of each PMIC. In this aspect, additionally or alternatively, an extrapolated voltage output of each PMIC may be extrapolated from the stored maps. The extrapolation may be within tolerances of the measured voltage output of each PMIC. The selection of gamma voltage may correspond to the extrapolated voltage output of each PMIC.

Another aspect provides a method for optical calibration of a plurality of displays. The method comprises, at a manufacturing stage, creating a plurality of one-time programmable (OTP) values for each display, each OTP value comprising a value of manufacture gamma voltage corresponding to a manufacture luminance and color value for a respective display. The plurality of OTP values is stored in a corresponding non-volatile memory of each respective display. At an assembly stage, each display is connected to a respective power management integrated circuit (PMIC). A plurality of assembly test voltages is applied to each display corresponding to the value of manufacture gamma voltage of each stored OTP value. Differences are measured between a plurality of assembly luminance and color values for each display and an expected luminance and color value as a result of applying each assembly test voltage corresponding to each stored OTP value. For each display, one value of manufacture gamma voltage of a respective OTP value is selected for the respective display corresponding to a minimal difference between the plurality of assembly luminance and color values and the expected luminance and color value. An error is found between assembly luminance and color value of a first one of the plurality of displays and assembly luminance and color value of a second one of the plurality of displays. One value of manufacture gamma voltage of the respective OTP value is reselected for the first one and the second one of the plurality of displays separately. The first one and the second one of the plurality of displays are assembled into a unitary two-panel device. The reselected value is determined from a minimization of the error found between the assembly luminance and color value of the first one and the assembly luminance and color value of a second one of the plurality of displays.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for optical calibration of a plurality of displays, the method comprising:
    at a manufacturing stage:
        creating a plurality of one-time programmable (OTP) values for each display, each OTP value comprising a value of a manufacture gamma voltage corresponding to a manufacture luminance and color value for a respective display; and
        storing the plurality of OTP values in a corresponding non-volatile memory of each respective display;
    at an assembly stage:
        connecting each display to a respective power management integrated circuit (PMIC);
        applying a plurality of assembly test voltages to each display corresponding to the value of manufacture gamma voltage of each stored OTP value;
        measuring differences between a plurality of assembly luminance and color values of each display and an expected luminance and color value as a result of applying each assembly test voltage corresponding to each stored OTP value; and
        for each display, selecting one value of manufacture gamma voltage of a respective OTP value for the respective display corresponding to a minimal difference between the plurality of assembly luminance and color values and the expected luminance and color value.

2. The method of claim 1, further comprising:
finding an error between assembly luminance and color value of a first one of the plurality of displays and assembly luminance and color value of a second one of the plurality of displays; and
reselecting one value of manufacture gamma voltage of the respective OTP value for the first one and the second one of the plurality of displays separately.

3. The method of claim 2, wherein the reselected value is determined from a minimization of the error found between the assembly luminance and color value of the first one and the assembly luminance and color value of a second one of the plurality of displays.

4. The method of claim 2, further comprising assembling the first one and the second one of the plurality of displays into a unitary two-panel device.

5. The method of claim 1, wherein creating the plurality of OTP values includes gamma correction for the manufacture luminance and color value at a plurality of manufacture gamma voltages for each of the plurality of displays.

6. The method of claim 2, further comprising:
measuring voltage output of a power management integrated circuit (PMIC) that powers each display, the voltage output corresponding to the assembly test voltage; and
determining a value of voltage output of the PMIC corresponding to minimized error of assembly luminance and color values;
wherein selecting a value of manufacture gamma voltage of a respective OTP value for the first one and the second one of the plurality of displays includes determination of a value of an assembly test voltage corresponding to the determined value of voltage output of the PMIC, the selected value of manufacture gamma voltage of a respective OTP value corresponding to the determined value of assembly test voltage.

7. The method of claim 6, wherein the determined value of assembly test voltage corresponds to a value on a curve of the assembly luminance and color values plotted against gamma voltage, the assembly luminance and color values being a function of voltage output of the PMIC and assembly test voltages.

8. The method of claim 6, further comprising
for each value of a plurality of voltage output values of the PMIC, plotting the plurality of assembly luminance and color values against the plurality of assembly test voltages;
extrapolating values of voltage output of the PMIC within the plotted values and assembly test voltages;
determining a corrected value of voltage output of the PMIC from the extrapolated values that minimizes the error found between the plurality of assembly luminance and color values; and
determining a corresponding value of assembly test voltage for the corrected value of voltage output of the PMIC.

9. The method of claim 8, wherein the extrapolated values of voltage output of the PMIC correspond to differences on the order of several millivolts of voltage output of the PMIC.

10. The method of claim 8, wherein the extrapolated values of voltage output of the PMIC are within tolerances of PMIC voltage output.

11. The method of claim 8, further comprising applying assembly test voltages outside of a range of manufacture gamma voltages to the PMIC and measuring resulting assembly luminance and color values, the resulting assembly luminance and color values included in plotting the plurality of assembly luminance and color values.

12. A display device, comprising:
at least two displays;
a non-volatile memory for each display, each memory including a plurality of stored values of manufacture gamma voltage corresponding to manufacture luminance and color values, each stored manufacture gamma voltage corresponding to a one-time programmable (OTP) value;
a user interface configured to receive a selection of gamma voltage from the OTP values of each display;
the user interface further configured to, for each display, measure a difference between current luminance and color values and an expected luminance and color value as a result of applying a test voltage corresponding to each stored OTP value, the selection of gamma voltage corresponding to a minimal difference between the current luminance and color values and the expected luminance and color value.

13. The device of claim 12, further comprising a unitary two-panel device into which the at least two displays are incorporated.

14. The device of claim 12, wherein the stored values of manufacture gamma voltage corresponding to manufacture luminance and color values include a manufacture gamma correction.

15. A display device, comprising:
at least two displays;
a non-volatile memory for each display, each memory including a plurality of stored values of manufacture gamma voltage corresponding to manufacture luminance and color values, each stored manufacture gamma voltage corresponding to a one-time programmable (OTP) value; and
a user interface configured to receive a selection of gamma voltage from the OTP values of each display,
the user interface further configured to find an error between luminance and color values of a first one and a second one of the displays, and the selection of gamma voltage is determined from a minimization of the error found between the luminance and color values of a first one and a second one of the displays.

16. The device of claim 15, further comprising a unitary two-panel device into which the at least two displays are incorporated.

17. A display device, comprising:
at least two displays;
a non-volatile memory for each display, each memory including a plurality of stored values of manufacture gamma voltage corresponding to manufacture luminance and color values, each stored manufacture gamma voltage corresponding to a one-time programmable (OTP) value;
a user interface configured to receive a selection of gamma voltage from the OTP values of each display;
a plurality of power management integrated circuits (PMICs), each powering a respective display; and
stored maps stored in the non-volatile memory, the stored maps generated by an assembly program that measures a voltage output of each PMIC and plots luminance and color values against assembly test voltages for each value of measured voltage output of each PMIC.

18. The device of claim 17, wherein an extrapolated voltage output of each PMIC is extrapolated from the stored maps, the extrapolation being within tolerances of the measured voltage output of each PMIC; and
the selection of gamma voltage corresponds to the extrapolated voltage output of each PMIC.

19. The device of claim 17, further comprising a unitary two-panel device into which the at least two displays are incorporated.

20. A method for optical calibration of a plurality of displays, the method comprising:
at a manufacturing stage:
creating a plurality of one-time programmable (OTP) values for each display, each OTP value comprising a value of manufacture gamma voltage corresponding to a manufacture luminance and color value for a respective display; and
storing the plurality of OTP values in a corresponding non-volatile memory of each respective display;
at an assembly stage:
connecting each display to a respective power management integrated circuit (PMIC);
applying a plurality of assembly test voltages to each display corresponding to the value of manufacture gamma voltage of each stored OTP value;
measuring differences between a plurality of assembly luminance and color values for each display and an expected luminance and color value as a result of applying each assembly test voltage corresponding to each stored OTP value;
for each display, selecting one value of manufacture gamma voltage of a respective OTP value for the respective display corresponding to a minimal difference between the plurality of assembly luminance and color values and the expected luminance and color value;
finding an error between assembly luminance and color value of a first one of the plurality of displays and assembly luminance and color value of a second one of the plurality of displays;
reselecting one value of manufacture gamma voltage of the respective OTP value for the first one and the second one of the plurality of displays separately; and
assembling the first one and the second one of the plurality of displays into a unitary two-panel device, wherein
the reselected value is determined from a minimization of the error found between the assembly luminance and color value of the first one and the assembly luminance and color value of a second one of the plurality of displays.

* * * * *